US008911148B2

(12) United States Patent
Mårtensson (10) Patent No.: US 8,911,148 B2
(45) Date of Patent: Dec. 16, 2014

(54) TEMPERATURE DETECTOR FOR A CONTACT THERMOMETER

(75) Inventor: Hans-Owe Mårtensson, Beddingestrand (SE)

(73) Assignee: INOR Process AB, Malmö (SE)

( * ) Notice: Subject to any disclaimer, the term of this patent is extended or adjusted under 35 U.S.C. 154(b) by 225 days.

(21) Appl. No.: 13/479,809

(22) Filed: May 24, 2012

(65) Prior Publication Data

US 2012/0300808 A1 Nov. 29, 2012

(30) Foreign Application Priority Data

May 27, 2011 (DE) .......................... 10 2011 103 331

(51) Int. Cl.
*H01C 1/14* (2006.01)
*G01K 7/16* (2006.01)
*G01K 1/16* (2006.01)
*G01K 1/08* (2006.01)
*G01K 1/14* (2006.01)

(52) U.S. Cl.
CPC ..... *G01K 1/14* (2013.01); *G01K 1/08* (2013.01)
USPC ........... 374/163; 374/179; 374/185; 374/208; 702/130; 338/226

(58) Field of Classification Search
USPC ......... 374/170, 178, 183, 185, 163, 141, 208, 374/179; 702/702; 73/866.5; 338/220, 221, 338/226
See application file for complete search history.

(56) References Cited

U.S. PATENT DOCUMENTS

| 4,516,106 | A | * | 5/1985 | Nolting et al. | ................... | 338/28 |
| 5,037,488 | A |   | 8/1991 | Wienand | | |
| 5,301,557 | A |   | 4/1994 | Cage et al. | | |
| 5,449,234 | A | * | 9/1995 | Gipp et al. | ..................... | 374/185 |
| 5,498,079 | A | * | 3/1996 | Price | .............................. | 374/208 |
| 5,781,098 | A | * | 7/1998 | Shibata | ........................... | 338/28 |
| 6,035,712 | A | * | 3/2000 | Ohta et al. | ....................... | 73/493 |
| 6,341,892 | B1 | * | 1/2002 | Schmermund | ................ | 374/185 |
| 6,588,931 | B2 | * | 7/2003 | Betzner et al. | ................. | 374/185 |
| 7,000,478 | B1 | * | 2/2006 | Zwollo et al. | ................... | 73/708 |
| 7,223,014 | B2 | * | 5/2007 | Lojen | ............................. | 374/120 |
| 7,441,950 | B2 | * | 10/2008 | Kamiyama et al. | ........... | 374/185 |
| 7,909,509 | B2 | * | 3/2011 | Mau | .............................. | 374/170 |
| 7,994,416 | B2 | * | 8/2011 | Schuh | ........................... | 136/230 |

(Continued)

FOREIGN PATENT DOCUMENTS

| DE | 199 13 195 | A1 | 10/2000 | | |
| EP | 0305027 | A2 * | 3/1989 | ............... | G01K 7/22 |

(Continued)

*Primary Examiner* — Gail Kaplan Verbitsky
(74) *Attorney, Agent, or Firm* — Roberts Mlotkowski Safran & Cole, P.C.; David S. Safran (57) ABSTRACT

A temperature detector for a contact thermometer of process measurement technology having a thermowell, at least one thermal sensor element arranged in a process-side end of the thermowell, and at least one electrical connecting means connected to the thermal sensor element with a first connection side and extending in the thermowell at least up to an evaluation-side end of the thermowell, so that the thermal sensor element can be electrically contacted via a second connection side of the electrical connecting means, and in which the electrical connecting means is formed by a connection printed circuit board with conducting paths.

4 Claims, 6 Drawing Sheets

(56) References Cited

U.S. PATENT DOCUMENTS

| | | |
|---|---|---|
| 8,303,179 B2 * | 11/2012 | Owen et al. .................... 374/178 |
| 8,305,186 B1 * | 11/2012 | Myers ............................. 338/25 |
| 2002/0006155 A1 * | 1/2002 | Wienand et al. .............. 374/185 |
| 2002/0117330 A1 * | 8/2002 | Eldridge et al. .............. 174/260 |
| 2008/0025372 A1 * | 1/2008 | Culbertson et al. ........... 374/185 |
| 2010/0202492 A1 * | 8/2010 | Larimer et al. ............... 374/185 |
| 2012/0193086 A1 * | 8/2012 | van Dijk et al. .............. 165/287 |

FOREIGN PATENT DOCUMENTS

| | | |
|---|---|---|
| FR | 2 942 026 A1 | 8/2010 |
| WO | 2012/005735 A1 | 1/2012 |
| WO | 2012/014025 A1 | 2/2012 |
| WO | 2012/038795 A1 | 3/2012 |

* cited by examiner

TEMPERATURE DETECTOR FOR A CONTACT THERMOMETER

BACKGROUND OF THE INVENTION

1. Field of the Invention

The invention relates to a temperature detector for a contact thermometer of process measurement technology having a thermowell, at least one thermal sensor element arranged in the process-side end of the thermowell and at least one electrical connecting means, wherein the electrical connecting means is connected to the thermal sensor element with a first connection side and extends in the thermowell at least up to the evaluation-side end of the thermowell, so that the thermal sensor element can be electrically contacted via a second connection side of the electrical connecting means.

2. Description of Related Art

Temperature detectors of the above mentioned type have been known for a long time in practice, wherein temperature detectors of this type come directly or indirectly into contact with the medium of which the temperature is to be determined. Contact thermometers should be presently differentiated from such thermometers that detect only thermal radiation coming from a medium. The thermowell of the temperature detector surrounds the thermal sensor element, wherein the thermal sensor element is normally arranged near a closed end of the thermowell. The thermal sensor element is often affixed in the thermowell with a heat-conducting medium, such as, for example, with a heat-conducting paste or a heat-conducting adhesive. The thermowell is thus closed on the process-side end and protects the thermal sensor element from the process. Often, a temperature detector of this type, however, is also used as an insert in a further protective casing; wherein the protective casing extends into the process and permanently protects the surroundings from the process. The temperature detector is then inserted with its thermowell into the additional protective casing. The other, evaluation-side end of the thermowell usually ends in a housing, anyway, wherein an evaluation or further processing of the signal occurs.

The thermal sensor element is normally a temperature-dependent resistor or a thermocouple that can be electrically contacted from outside of the thermowell via the electrical connecting means. A compact, modular construction around a contact head is used as housing, in which an electrical connection is produced indirectly via the electrical connecting means between the outside world and the sensor element. The contact head can, however, also have a transmitter, which has the task of filtering and linearizing a signal coming from the sensor element into a standardized signal and to provide higher-ranking process monitoring.

The electrical connection means normally implements at least two electrically conductive paths between the thermal sensor element and the connections located outside of the thermowell. In implementing the thermal sensor element as a temperature-dependent resistor, a voltage or a current is applied to the thermal resistor and correspondingly, the resulting current or the resulting voltage is determined and the temperature can then be determined using the resulting resistance values. In the simplest implementation of the electrical connecting means with two electrically conducting paths, changing resistances cannot be compensated, which is why implementations are often preferred in which the electrical connecting means have three or even four electrical leads as reference resistors.

Temperature detectors known from the prior art are relatively expensive, which, on the one hand, is due to the relatively complex production, and on the other hand, however, due to the materials being used. Temperature detectors known from the prior art often have mineral insulation of the electrical connecting means in the thermowell. Here, the electrical connecting means are located, for example, in a mineral or ceramic powder and the temperature detector has to be subject to heat treatment after mounting the thermal sensor element so that the mineral or ceramic powder is drought. Apart from the electrical connecting means with mineral insulation being expensive, they are also difficult to deal with in production, since it is necessary to make sure that the mineral powder remains in contact when mounting the thermal sensor element, which is difficult for thermowell diameters having only few millimeters to fractions of a millimeter and is practically not applicable for automation.

SUMMARY OF THE INVENTION

The primary object of the present invention is to provide a temperature detector that has a simple and economical construction, so that the temperature detector can also be used for mass application, in particular for such applications that lie in a comparably low temperature range, for example, up to 300° C.

The temperature detector according to the invention, in which the above described and depicted object is met, is initially and essentially wherein the electrical connecting means is formed by a connection printed circuit board with conducting paths. The term "connection printed circuit board" is subsequently used for the printed circuit board or the printed circuit board section that is used for implementing the electrical connecting means, the term "connection printed circuit board" helps to more exactly specify the general term "printed circuit board," and thus, aids in clarification. The use of a printed circuit board according to the invention as electrical connecting means instead of the implementation of electrical connecting means known from the prior art has the advantage of having a substantially simplified mounting, which can additionally be automated, wherein the printed circuit boards, even when having to meet certain temperature requirements, are comparably economical compared to known implementation.

The connection printed circuit board has to be made of such a material that is temperature-resistant in each application. Basically, all known printed circuit boards are initially suitable for implementing the temperature detector according to the invention. In addition to the known printed circuit boards on a phenol or epoxy resin basis, printed circuit boards are also possible that are based on the used of polytetrafluoroethylene or ceramic. The implementation of the electrical connecting means with a connection printed circuit board is advantageous because printed circuit boards are practically produced in arbitrary shape in a simple manner and electrical leads can be implemented in arbitrary fashion on such a printed circuit board—one-sided, two-sided or in an interface layer of the printed circuit board.

In a preferred design of the invention, it is provided that that the thermal sensor element is arranged on the connection printed circuit board, wherein the thermal sensor element is, in particular, a temperature-dependent resistor or a thermocouple and is soldered to the conducting paths there.

In a particularly preferred design of the invention, it is further provided that that the second connection side of the electrical connecting means is connected to a contact means formed on a contact printed circuit board. The term "contact printed circuit board" is used to specifically clarify the printed circuit board or the area of the printed circuit board on which the above-mentioned contact means is provided, the term is used to aid in clarification. This further design of the invention is of considerable importance.

Contact means known from the prior art are usually implemented by a very complexly designed ceramic head, which normally has bolted connections in order to be able to contact the sensor element via the electrical connecting means from outside. These ceramic heads are only able to make extreme contacts, but are able to aid in the adjustment of signals if replaced by a transmitter. The temperature detector according to the invention refrains from such a complex design and replaces it with a simple contact printed circuit board, on which a contact means is provided, wherein a spring-clip, clamp terminal or insulation-displacement termination can be made into an external conductor with the contact means, which is also possible using standard contact means for assembly of printed circuit boards. The design of the invention overcomes the decade-long prevailing belief that all elements of a temperature detector have to comply with maximum requirements.

In a preferred design, the connection printed circuit boards and the contact printed circuit boards are integrally formed, and thus the connection printed circuit board and the contact printed circuit board are different areas of one common whole printed circuit board. The advantage of this construction can be seen in that the mounting is reduced to a minimum, namely a possibility is created for external contact of the evaluation-side end of the electrical connecting means by inserting the combined connection and contact printed circuit board into the thermowell.

In an alternative and also very advantageous design of the temperature detector according to the invention, the connection printed circuit board and the contact printed circuit board are designed as separate printed circuit boards. This has the advantage that different printed circuit board materials can be used for the connection printed circuit board and the contact printed circuit board. This design makes it possible to use a printed circuit board material with higher temperature stability for the connection printed circuit board, i.e. the printed circuit board subject at least partially to the medium temperature, for example a printed circuit board material suitable for temperatures above 300° C., in particular of polyimide.

In a further advantageous design, it is provided that the contact printed circuit board consists of a printed circuit board material that is constantly stable at lower temperatures, in particular at temperatures lower than 300° C., particularly less than 250° C., preferably 230° C. This is possible with no danger, since the printed circuit board is provided on the end of the temperature detector facing away from the process, and thus, has only to comply with considerably lower requirements in terms of temperature stability. The advantage is that substantially more economical printed circuit board materials can be used than is the case for higher temperature requirements. This further allows for the costs for the temperature detector according to the invention to be reduced.

In a further design, it is provided that the connection printed circuit board has wide sections on its edges running parallel to the thermowell, which cause the connection printed circuit board to be positioned in the middle of the thermowell. Due to the wide sections, the contact surfaces between connection printed circuit board and thermowell are additionally minimized, which simplifies the insertion of the connection printed circuit board into the thermowell.

In another design of the temperature detector according to the invention, an electric formation is implemented on the connection printed circuit board, especially an electric formation for monitoring leaks in the thermowell, which is only possible with substantial effort in the implementations of the prior art. In the simplest case, such an electric formation can only be formed of contact areas facing each other, wherein the impedance between the contact areas is evaluated for leak detection. In a further design, an evaluation circuit is implemented on the contact printed circuit board in order to watch the mentioned electrical formation and to check for leaks in the thermowell.

In detail, there are different possibilities for designing and further developing the temperature detector according to the invention. Thus, reference should be made to the detailed description of the preferred embodiments in conjunction with the accompanying drawings.

DETAILED DESCRIPTION OF THE INVENTION

Figure 1:
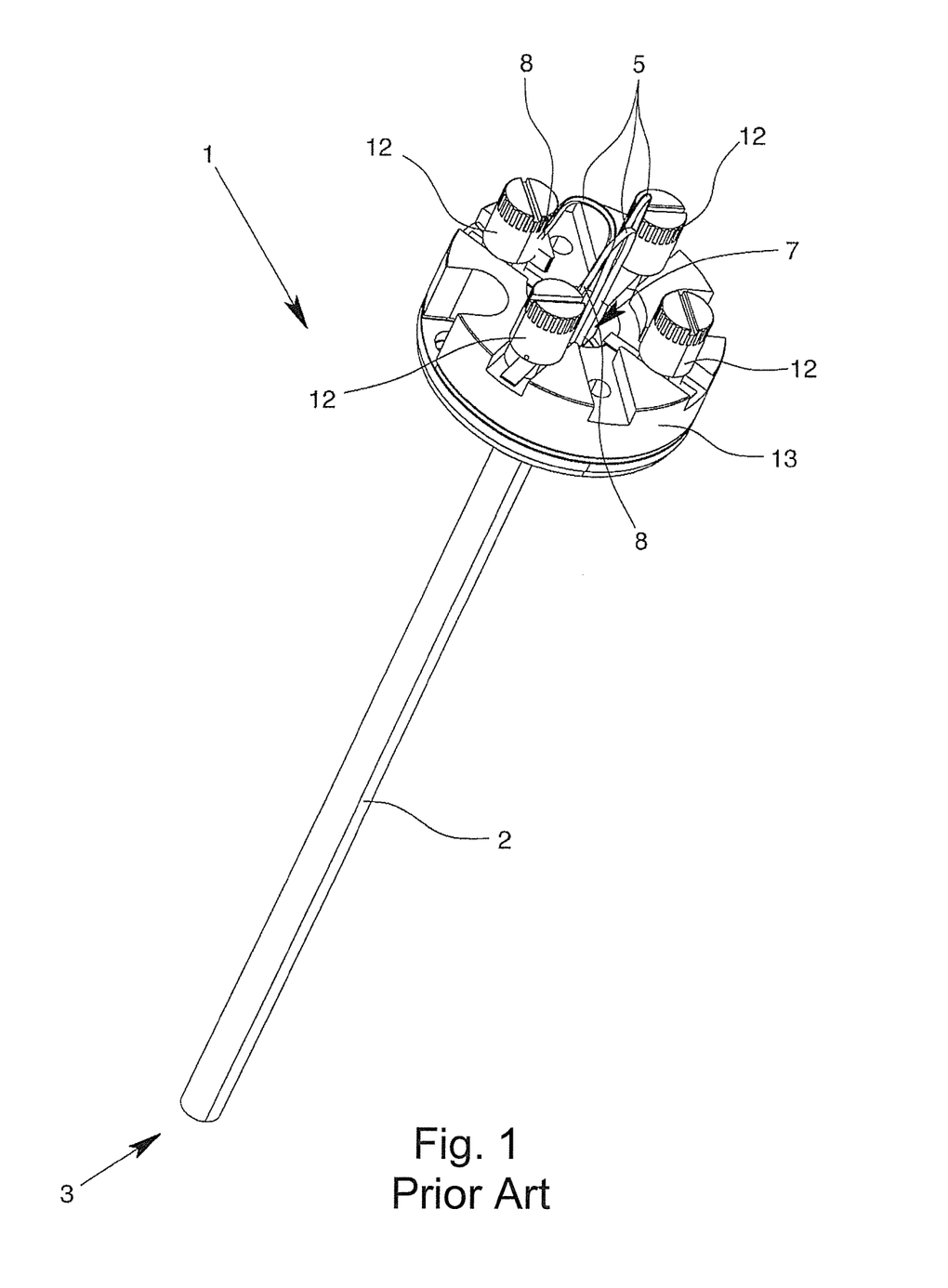
FIG. 1 is a perspective view of a temperature detector with a contact means according to the prior art
Figure 2:
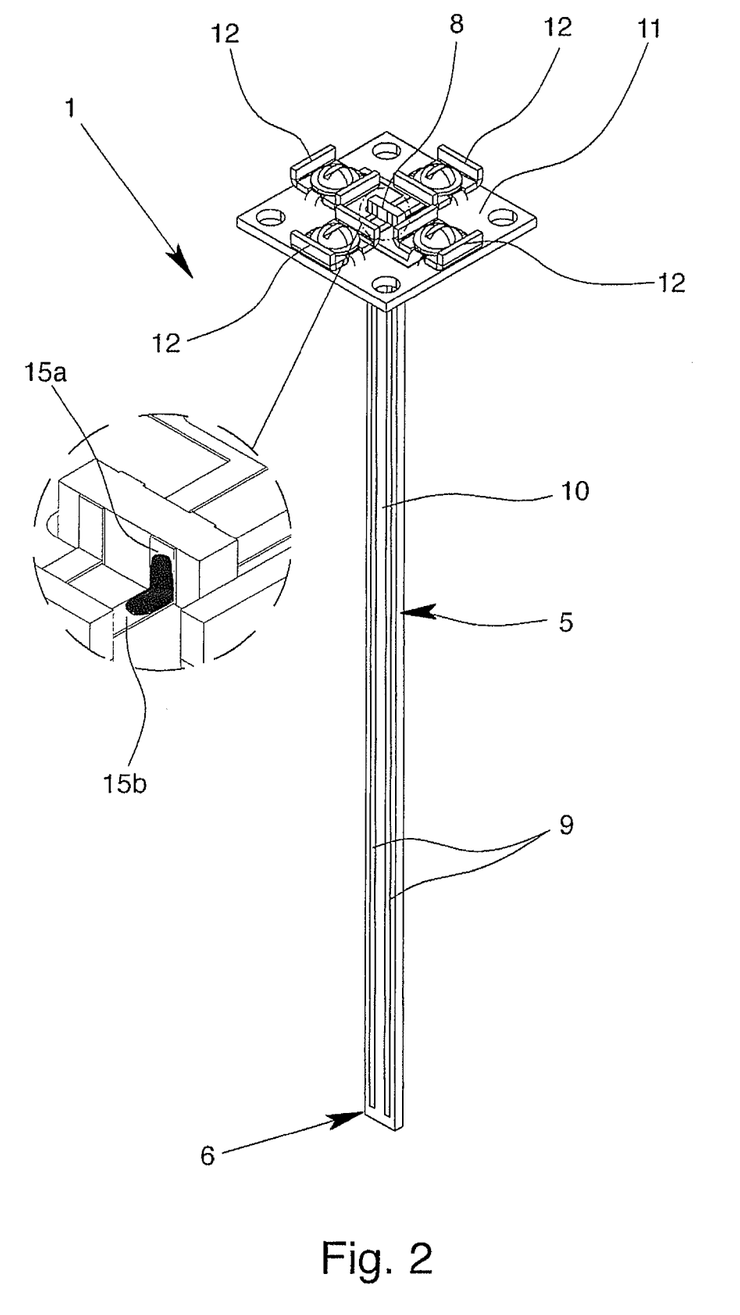
FIG. 2 is a perspective view of a first embodiment of a temperature detector according to the invention with contact means.
Figure 3:
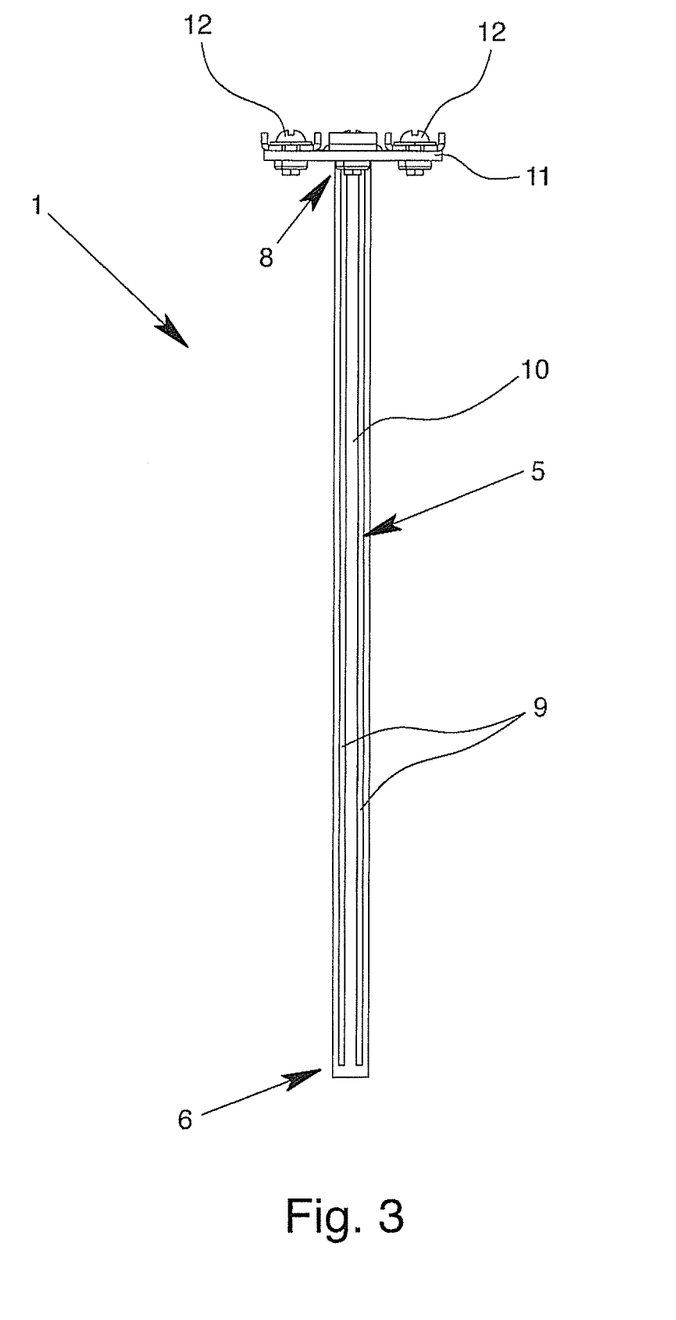
FIG. 3 is a side view of the temperature detector according to the invention as shown FIG. 2.
Figure 4:
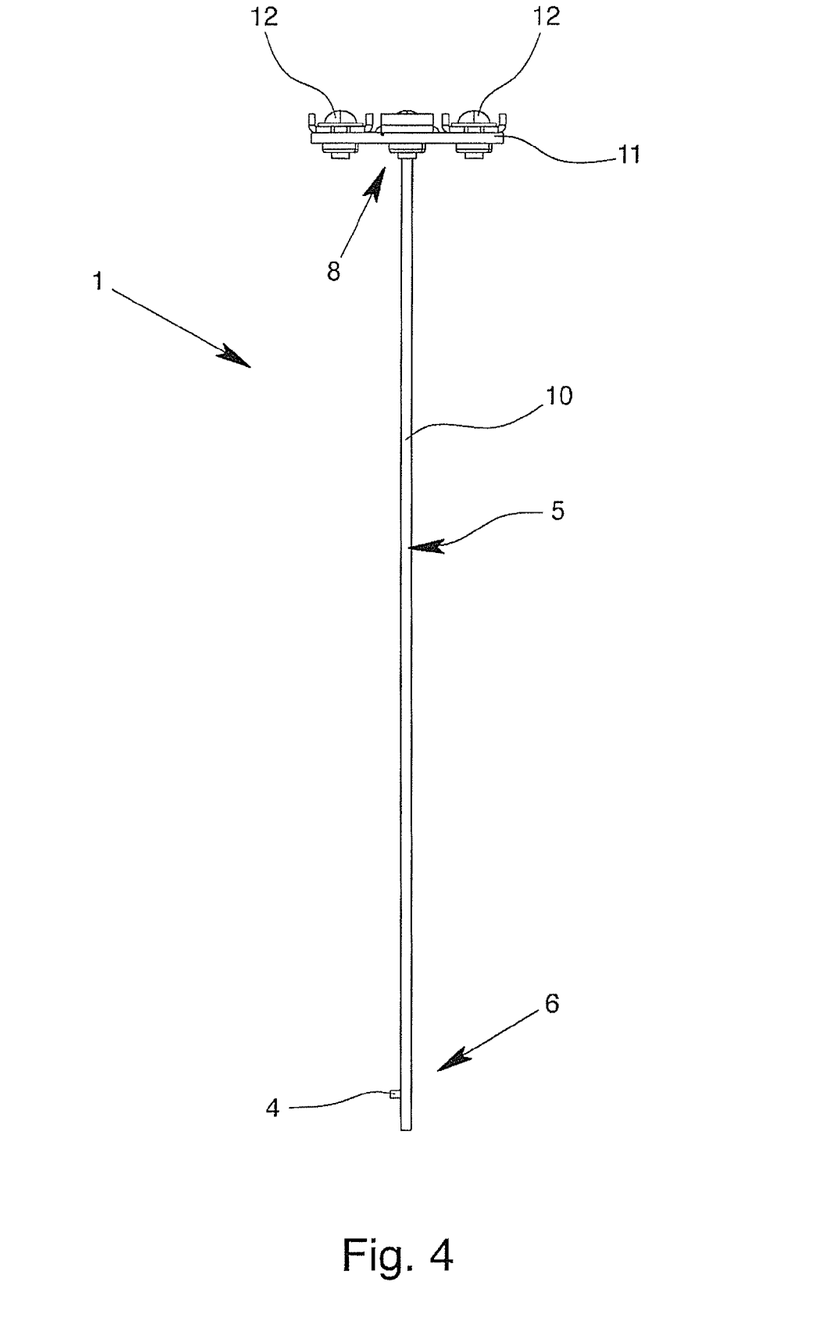
FIG. 4 is another side view of the temperature detector according to the invention as per FIG. 2.
Figure 5:
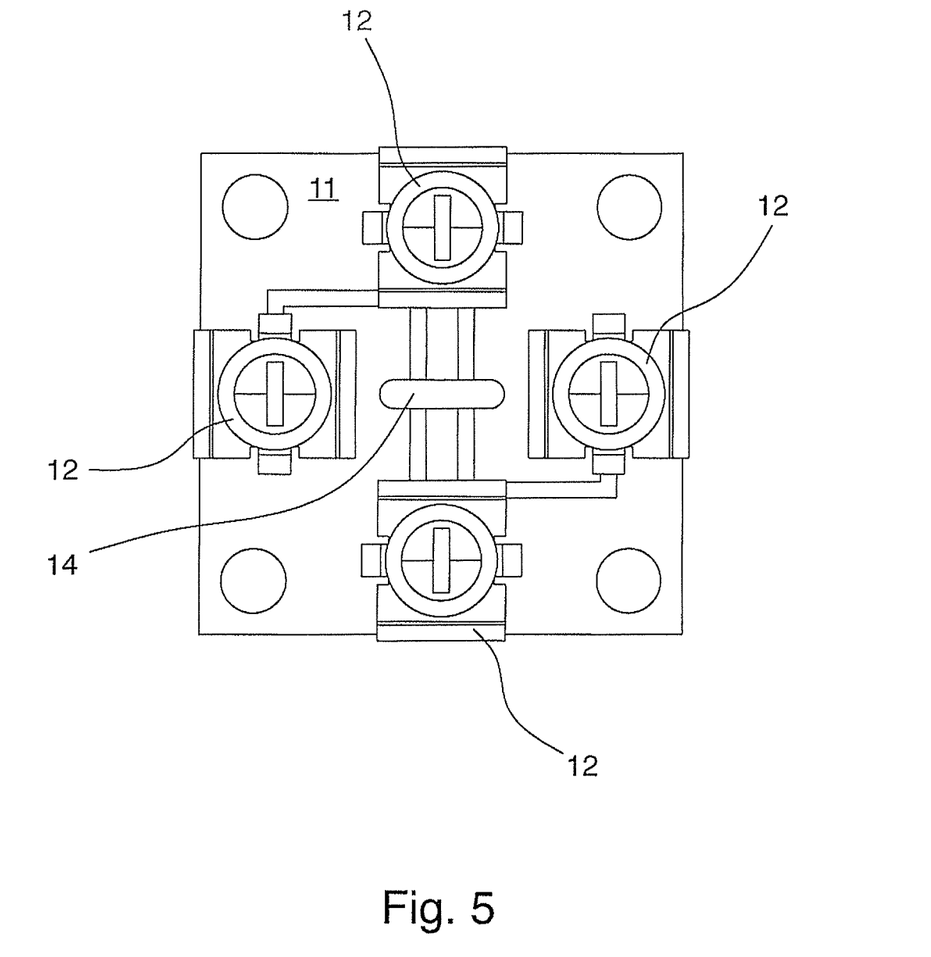
FIG. 5 is a top view of the contact means of the temperature detector according to the first embodiment.

A temperature detector 1 known from the prior art is shown in FIG. 1, which is intended for contact thermometers of process measurement technology. The temperature detector 1 has a thermowell 2, in which a thermal sensor element is arranged on the process-side end 3 (not shown in FIG. 1), which is provided with reference numbers in FIGS. 4 & 6.

The temperature detector 1 further has electrical leads as electrical connecting means 5, wherein this electrical connecting means 5—as can be seen in the version according to the invention in FIGS. 2 to 4 & 6—is connected to the thermal sensor element 4 with a first connection side 6. The electrical connecting means 5 then runs in the thermowell 2 to the evaluation-side end 7 of the thermowell 2, so that the thermal sensor element 4 can basically be electrically contacted via a second connection side 8 of the electrical connecting means 5. As can be seen in FIG. 1, the electrical connecting means 5 in the prior art is formed of a plurality of electrical leads, presently of three leads, where two of these leads are connected to a connector of the thermal sensor element and a further lead is connected to the second end of the thermal sensor element.

In the embodiment of the prior art according to FIG. 1, the electrical connecting means 5 in the form of leads is provided with mineral insulation found in the thermowell 2, which, in particular, is problematic during production of an electrical connection between the sensor element and the electrical connecting means 5, makes heat treatment necessary and is expensive.

In the temperature detector 1 shown in FIGS. 2, 3, 4, & 6, the electrical connecting means 5 is formed by a printed circuit board with conducting paths 9, wherein this printed circuit board forming the connecting means 5 is called connection printed circuit board 10 in the following. The connection printed circuit board 10 has two conducting paths 9 on each side, which makes it possible to electrically contact the sensor element 4 via the second connection side 8—i.e., the connection side that is found close to the evaluation-side end 7 of the thermowell 2.

It is particularly convenient that the thermal sensor element 4 can be and is arranged directly on the connection printed circuit board 10, wherein presently the thermal sensor element 4 is implemented as a temperature-dependent resistor of the type PT100.

It is of particular advantage in the embodiment of temperature detector 1 shown in FIGS. 2 to 6 that the second connection side 8 of the electrical connecting means 5 is connected to a contact means 12 formed on a printed circuit board 11, wherein this printed circuit board 11 having the contact means 12 is called contact the printed circuit board 11. In the embodiment according to FIGS. 2 to 5, the contact means 12 is implemented with bolt fastener technology. Bolted connections are known from the prior art and here, again, please refer to FIG. 1 representing the prior art. In the prior art, the contact means 12 is formed in conjunction with a complexly designed ceramic head 13, wherein this ceramic head 13 often has a complex preloaded spring mechanism for mounting; this construction is robust in many respects, but is often too complex, heavy and expensive for a concrete application. In contrast, the implementation of the contact means 12 provided on the contact printed circuit board 11 is very simple and economical, in particular for the reason that standard construction elements can be used across the board.

Figure 6:
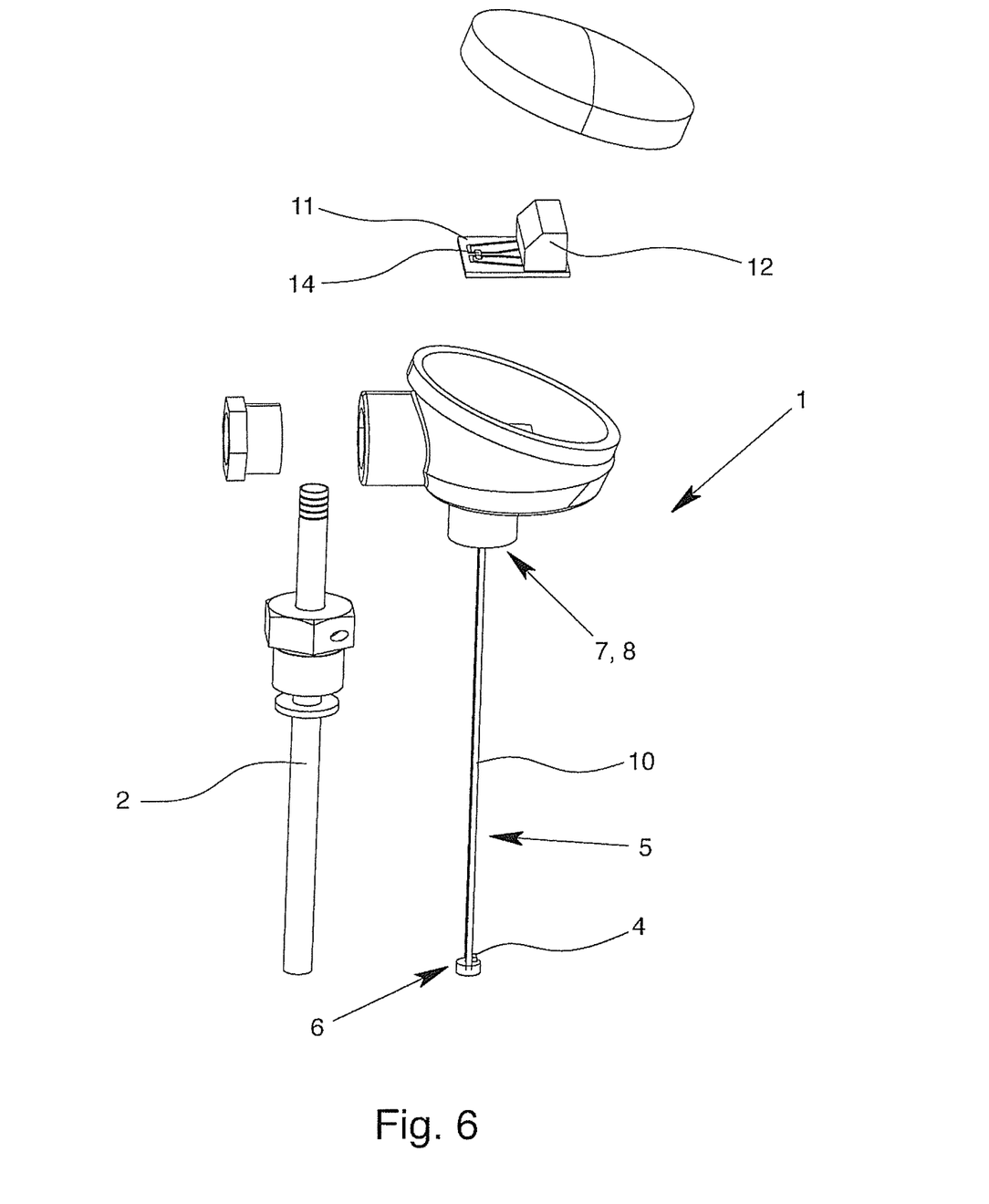
FIG. 6 is an enlarged, exploded view a further embodiment of a temperature detector according to the invention with a protective casing.

In the embodiment shown in FIG. 6, the contact means 12 is implemented via plug-in technology, so that an external conductor can be easily inserted in the contact means 12 and is securely held with a clamp mechanism.

The embodiments shown in FIGS. 2 to 6 have further in common that the connection printed circuit board 10 and the contact printed circuit board 11 are designed as separate printed circuit boards and are arranged essentially perpendicular to one another. The secure connection between the connection printed circuit board 10 and the contact printed circuit board 11 is implemented in the illustrated embodiments in that the contact printed circuit board 11 has a recess 14 that accommodates a corresponding section of the connection printed circuit board 10. Due to the interlocking of the connection printed circuit board 10 and the contact printed circuit board 11, the two printed circuit boards support one another. The recess 14 in the connection printed circuit board 10 can be made so narrowly that a light press fit is implemented.

In the illustrated embodiments, the connection printed circuit board 10 and the contact printed circuit board 11 have opposing conducting areas 15a, 15b in the area of their common connection point, wherein the opposing conducting areas 15a, 15b are soldered to one another so that the connection between the connection printed circuit board 10 and the contact printed circuit board 11 are additionally stabilized.

The conducting areas 15a, 15b opposing one another and soldered to one another of the connection printed circuit board 10 and the contact printed circuit board 11 electrically connect the electrical connecting means 5 or the electrical conducting paths 9 of the connection printed circuit board 10 to the contact printed circuit board 11 so that an electrical connection to the contact means 12 can be made in a very simple manner.

In the embodiments shown in FIGS. 2 to 6, the connection printed circuit board 10 is made of printed circuit board material with standard characteristics, the contact printed circuit boards 11 are made of a temperature-resistant material, presently of high performance polyimide that is E-glass reinforced.

The temperature detectors 1 shown and described are suitable for applications in a comparably low temperature measurement range of, for example, up to 200° C. Process thermometers—as shown, for example, in FIG. 6—that are implemented with a temperature detector using the described printed circuit boards, have a substantial cost advantage and are consequently suitable for automated mass production and for mass applications, e.g., also in the field of private households, for example, within the scope of heating systems such as, e.g., zone heating distribution stations.

What is claimed is:

1. Temperature detector for a contact thermometer of process measurement technology comprising:
    a thermowell having a process-side end and an evaluation-side end,
    at least one thermal sensor element arranged in said process-side end of the thermowell,
    a connection printed circuit board having a first connection side, a second connection side, conducting paths, and at least one conducting area on said second connection side, and
    a contact printed circuit board having at least one contact means and at least one conducting area,
    said connection printed circuit board and said contact printed circuit board being separate printed circuit boards,
    said connection printed circuit board being connected to the thermal sensor element with said first connection side and extending in the thermowell with said second connection side at least up to said evaluation-side end of the thermowell,
    said thermal sensor element being electrically contacted via said conducting paths of said connection printed circuit board
    said conducting areas of said connection printed circuit board and of said contact printed circuit board being directly located in an area of joining of said connection printed circuit board and of said contact printed circuit board,
    wherein said conducting areas of said connection printed circuit board and of said contact printed circuit board are electrically connected in order to electrically connect said conducting paths of said connection printed circuit board to said at least one contact means of said contact printed circuit board,
    wherein the connection printed circuit board and the contact printed circuit board are arranged perpendicular to one another and
    wherein said contact printed circuit board has a recess for receiving said connection printed circuit board.

2. Temperature detector according to claim 1, wherein the thermal sensor element is arranged on the connection printed circuit board, and wherein the thermal sensor element is a temperature-dependent resistor or a thermocouple.

3. Temperature detector according to claim 1, wherein the contact means is implemented on the contact printed circuit board using one of spring-clip, clamp terminal and an insulation-displacement termination.

4. Temperature detector for a contact thermometer of process measurement technology comprising:
    a thermowell having a process-side end and an evaluation-side end,
    at least one thermal sensor element arranged in said process-side end of the thermowell, a connection printed circuit board having a first connection side, a second connection side, conducting paths, and at least one conducting area on said second connection side, and a contact printed circuit board having at least one contact means and at least one conducting area, said connection printed circuit board and said contact printed circuit board being separate printed circuit boards, said connection printed circuit board being connected to the thermal sensor element with said first connection side and extending in the thermowell with said second connection side at least up to said evaluation-side end of the thermowell, said thermal sensor element being electrically contacted via said conducting paths of said connection printed circuit board said conducting areas of said connection printed circuit board and of said contact printed circuit board being directly located in an area of joining of said connection printed circuit board and of said contact printed circuit board, wherein said conducting areas of said connection printed circuit board and of said contact printed circuit board are electrically connected in order to electrically connect said conducting paths of said connection printed circuit board to said at least one contact means of said contact printed circuit board, wherein the conducting areas of the connection printed circuit board and the contact printed circuit board are soldered to one another.

\* \* \* \* \*